United States Patent [19]

Suzuki et al.

[11] Patent Number: 4,749,896
[45] Date of Patent: Jun. 7, 1988

[54] VIBRATION WAVE MOTOR

[75] Inventors: Nobuyuki Suzuki, Yokohama; Masao Shimizu, Kawasaki; Mitsuhiro Katsuragawa, Zama, all of Japan

[73] Assignee: Canon Kabushiki Kaisha, Tokyo, Japan

[21] Appl. No.: 71,313

[22] Filed: Jul. 9, 1987

[30] Foreign Application Priority Data

Jul. 14, 1986 [JP] Japan .................................. 61-165066

[51] Int. Cl.$^4$ ............................................ H01L 41/08
[52] U.S. Cl. ...................................... 310/316; 310/323
[58] Field of Search ............................... 310/314–319, 310/323, 328; 318/116, 118

[56] References Cited

U.S. PATENT DOCUMENTS

| 4,504,760 | 3/1985 | Yammamoto | 310/323 |
| 4,510,411 | 4/1985 | Hakamata et al. | 310/323 X |
| 4,562,373 | 12/1985 | Tokusima et al. | 310/323 X |
| 4,613,782 | 9/1986 | Mori et al. | 310/323 |
| 4,658,172 | 4/1987 | Izukawa | 310/316 |
| 4,692,649 | 9/1987 | Izukawa | 310/323 X |
| 4,692,672 | 9/1987 | Okuno | 310/323 X |

Primary Examiner—Mark O. Budd
Attorney, Agent, or Firm—Fitzpatrick, Cella, Harper & Scinto

[57] ABSTRACT

In a vibration wave motor, one of periodic signals of different phases to be applied to first and second electro-mechanical energy conversion elements is generated without frequency-dividing an output of an oscillator and a phase-shifted signal with respect to the output of the oscillator is generated by a phase locked loop and applied to the other conversion element.

9 Claims, 8 Drawing Sheets (a) 17(1-1)

(b) $Q_8$ (c) 18(S)

(d) 2(R)

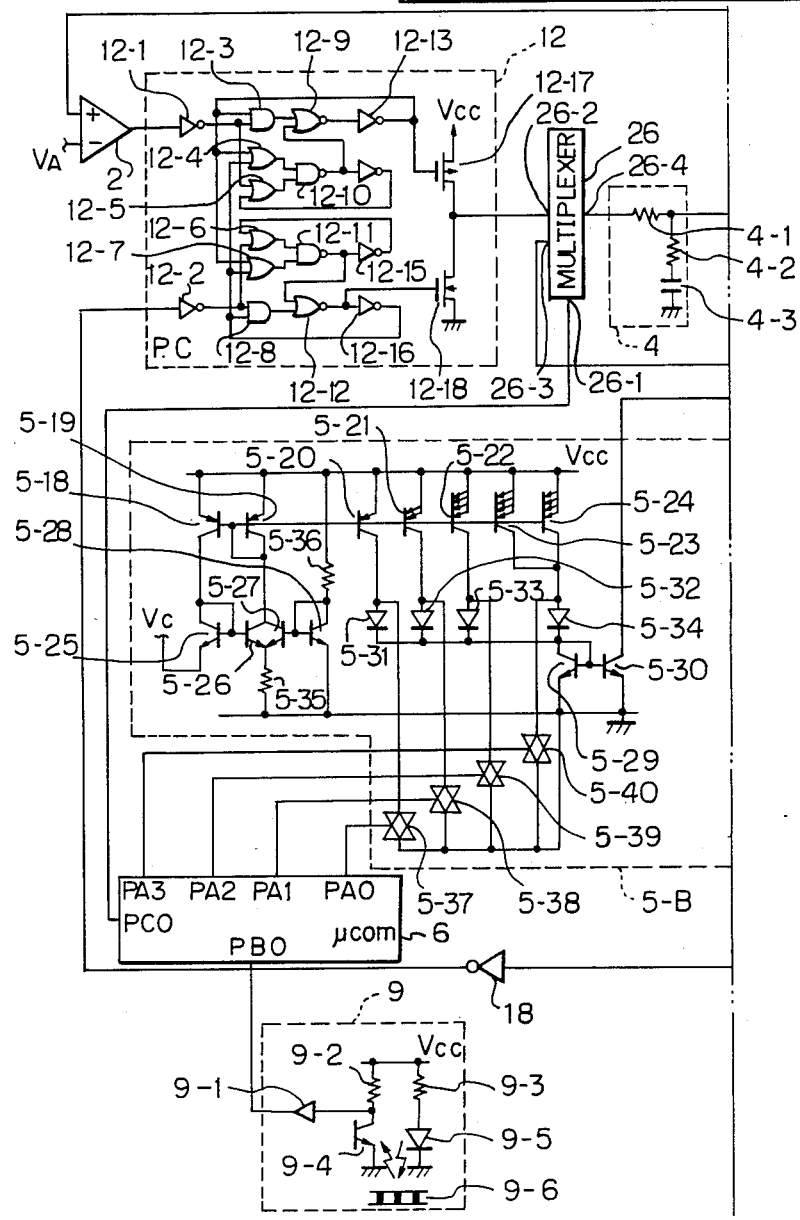

VIBRATION WAVE MOTOR

BACKGROUND OF THE INVENTION

1. Field of the Invention

The present invention relates to a vibration wave motor, and more particularly to a drive circuit for a vibration wave motor which controls a drive frequency of a motor by a phase locked loop.

2. Related Background Art

A drive circuit for a vibration wave motor which always drives the motor at a resonant frequecy by using a phase locked loop has been proposed by the present applicant in Japanese patent application No. 226566/1985 (U.S. Ser. No. 915,429).

FIG. 1 shows the drive circuit of the above patent application.

Numeral 1 denotes a stator as a vibration member on which electrostrictive elements are arranged, and numerals 1-1, 1-2 and 1-3 denote electrodes. The electrodes on the stator are arranged as shown in FIG. 2. The electrodes 1-1 and 1-2 are arranged on two groups of electrostrictive elements polarized on the surface of the stator and serve as drive electrode which apply periodic voltages having a phase difference of 90° therebetween to the respective groups of electrostrictive elements. The electrode 1-3 is arranged on a electrostrictive element electrically insulated from the drive electrodes 1-1 and 1-2 and serves as a monitor electrode for detecting a vibration status of the stator by the output of the electrostrictive element. Numeral 1-4 denotes a common electrode to the electrodes 1-1, 1-2 and 1-3. The directions of polarization and arrangement of the electrostrictive elements are known and hence explanation thereof is omitted. Numerals 7 and 8 denote amplifiers and numerals 10 and 11 denote coils which are connected to the drive electrodes 1-1 and 1-2.

Numeral 17 denotes a comparator which is connected to the electrode 1-1 and shapes a sine wave of the electrode to produce a logic level pulse. Numeral 2 denotes a comparator which converts an output waveform (sine wave) of the monitor electrode to a logic level pulse. Numeral 12 denotes a phase comparator having one input terminal thereof connected to an output of the comparator 2 and the other input terminal connected to an inverter 18. It is known by U.S. Pat. No. 4,291,274 and hence detail thereof is not explained. It produces an output only when a phase difference between the inputs is detected.

Block diagram and input/output characteristic are shown in FIGS. 3 and 4. When an input pulse (rising signal) to an input terminal R is applied earlier than a rising signal to an input terminal S, the output is Vcc (high level signal H) only during a period between the rising signals, and the output is open (high impedance state) by the input of the rising signal to the input terminal S.

When the input pulse (rising signal) to the input terminal S is applied earlier than the rising signal to the input terminal R, the output is ground level (low level L) during the period between the rising signals.

The output is open other than when it is H or L. Accordingly, when the phase difference is zero, the output is kept open.

Numeral 4 denotes a low-pass filter which filters the output of the comparator 12. Numeral 5 denotes a voltage controlled oscillator (VCO) which produces a signal of a duty factor of 50% at a frequency determined by the input voltage. An input thereof is connected to the output of the low-pass filter 4. The input voltage and the output frequency of the VCO 5 is of linear function so that as the voltage goes higher, the output frequency goes higher.

In order to prevent the vibration wave motor from being locked at a resonance frequency other than a true resonance frequency, the oscillation frequency of the VCO 5 is restricted. For example, assuming that the true resonance frequency of the vibration wave motor is 40 KHz and adjacent resonance frequencies are 38 KHz and 42 KHz, the VCO 5 is restricted to oscillate within a range of 38 KHz to 42 KHz excluding 38 KHz and 42 KHz.

Numeral 19 denotes a frequency divider which frequency-divides the output of the VCO 5 by a factor of 32. An output of the frequency divider is applied to the electrode 1-1 through the amplifier 7 and the coil 10. The output of the frequency divider 19 is connected to a D input terminal of an eight-stage shift register 20. The output of the VCO 5 is supplied to a clock terminal of the register 20 as a clock pulse. Since the frequency of the VCO 5 is 32 times as high as that of the output pulse of the frequency divider 19, the frequency of the D input of the register 20 is also 32 times as high as that of the clock pulse, and the output pulse Q8 of the shift register 20 is 90° retarded with respect to the D input signal. The oscillation frequency of the VCO 5 is selected to 32 times of the resonance frequency of the vibration wave motor.

Numeral 25 denotes an eight-stage shift register. The output of the comparator 17 is supplied to the D input terminal of the register and the output of the VCO 5 is applied to the clock input terminal. Accordingly, a pulse retarded by 90° with respect to the input signal to the D input terminal is produced at the output terminal Q8. Since the output pulse of the frequency divider 19 and the output pulse of the comparator 17 are of the same phase, the output pulse Q8 of the eighth stage of the shift register 25 which receives the output pulse of the frequency divider 19 as the D input and the output of the VCO 5 as the clock is retarded by 90° with respect to the D input signal or the signal of the electrode 1-1.

The output Q8 of the shift register 25 is applied to an S input of the phase comparator 12 through an inverter 18. The electrodes 1-1 and 1-3 are arranged in 90° shift relationship, and the output frequency of the VCO 5 is restricted such that it is within adjacent resonance frequencies to the true resonance frequency of the vibration wave motor.

The operation of the vibration wave motor thus constructed is now explained.

In the vibration wave motor, when it is in a resonance state, a phase of the drive signal of the electrode 1-1 or 1-2 and a phase of the signal of the monitor electrode 1-3 are in a predetermined relationship depending on a positional relationship of the drive electrode 1-1 or 1-2 and the monitor electrode 1-3, that is, the positional phase relationship of the electrodes and the phase relationship of the signals of the electrodes are identical. If the above phase relationship is maintained, the vibration wave motor can always be resonance-driven. In the vibration wave motor shown in FIG. 1, the electrodes 1-1 and 1-3 are arranged with 90° phase shift. Thus, if the waveforms of the electrodes 1-1 and 1-3 are shifted by 90° from each other, the vibration wave motor can be resonance-driven. In the vibration wave motor of FIG. 1, the phases of the waveforms at the electrodes 1-3 and 1-1 are detected by the comparator 12 and controlled to keep the 90° phase difference therebetween.

The operation is now explained. The VCO 5 generates a pulse of 50% duty factor at a predetermined frequency. The pulse is frequency-divided by a factor of 32 by the frequency divider 19 and they are supplied to the first group of electrostrictive elements on the stator 1 through the amplifier 7, coil 10 and electrode 1-1. A signal produced at the electrode 1-1 by the action of a resonance circuit comprising the coil 10, electrode 1-1 and stator 1 is a sine wave, which is applied to the electrostrictive elements.

On the other hand, the output of the frequency divider 19 is applied to the D input of the shift register 20 and the output pulse of the VCO 5 is applied to the register 20 as the clock pulse. Accordingly, the Q8 output pulse of the register 20 is 90° shifted with respect to the output pulse of the frequency divider 19 and it is converted to a sine wave by the amplifier 8, coil 11 and electrode 1-2 and the sine wave is applied to the record group of electrostrictive elements. If the sine waves applied to the electrodes 1-1 and 1-2 are at the resonance frequency of the vibration wave motor, the periodic voltages having the 90° phase difference are applied to the respective groups of electrostrictive elements having the phase difference therebetween and a travelling vibration wave is generated on the surface of the stator 1 and the movable member which frictionally contacts to the stator is driven by the travelling vibration wave so that it rotates.

The vibration of the stator is converted to a periodic voltage representing the vibration by the electrostrictive elements connected to the electrode 1-3 and it is detected by the monitor electrode and converted to a pulse by the comparator 2, and the pulse is supplied to the R input of the comparator 12. On the other hand, the waveform of the electrode 1-1 is converted to a pulse by the comparator 17 and the pulse is supplied to the D input of the register 25. Since the shift clock pulse of the register 25 is the pulse from the VCO 5, the output pulse Q8 of the shift register 25 is retarded by 90° with respect to the waveform of the electrode 1-1. It is inverted by the pulse inverter 18, the output of which is supplied to the S input of the phase comparator 12.

As described above, the output pulse Q8 of the register 25 is retarded by 90° as shown in FIG. 5(b) with respect to the pulse applied to the amplifier 7 as shown in FIG. 5(a). This pulse is inverted by the inverter 18 and the inverted pulse is applied to the S input of the comparator 12. Accordingly, the pulse to the S input of the comparator 12 is advanced by 90° as shown in FIG. 5(c) with respect to the pulse of FIG. 5(a).

Thus, if the phase of the pulse at the S input of the comparator 12 is in phase with the phase of the pulse at the R input of the comparator 12, there is a 90° phase difference between the electrodes 1-3 and 1-1 and the resonance state is detected. If the input signals to the R input and S input of the comparator 12 are in phase, the comparator 12 keeps its output open and the VCO 5 continues the oscillation. Accordingly, the resonance drive is kept.

When the vibration wave motor is not in the resonance state, the signal of the electrode 1-3 is shifted forward or backward from the 90° phase shift with respect to the signal of the electrode 1-1. Accordingly, the phases of the pulses to the R input and S input of the comparator 12 are not in phase. For example, if the rise signal of the pulse to the R input of the comparator 12 occurs earlier than the rise signal of the pulse to the S input as shown in FIG. 4, the output of the comparator 12 is H for a period corresponding to a time difference between the rise times. If the rise signal to the S input occurs earlier than the rise signal to the R input, the output of the comparator 12 is L for the period corresponding to the rise time difference. Accordingly, if the pulse of the comparator 2, that is, the waveform of the electrode 1-3 is advanced with respect to the pulse of the inverter 18, namely, if the phase difference between the waveforms of the electrodes 1-1 and 1-3 is larger than 90°, the output of the comparator 12 is H for a period corresponding to the phase difference and the H output is supplied to the VCO 5 through the low-pass filter 4. As a result, the input voltage to the VCO 5 increases and the oscillation frequency rises accordingly. As the oscillation frequency of the VCO 5 goes higher, the signal applied to the electrode 1-1 is more advanced with respect to the signal generated at the electrode 1-3. Accordingly, the phase difference between the electrodes 1-1 and 1-3 is controlled toward 90°.

If the phase difference between the electrodes 1-1 and 1-3 is smaller than 90°, the rise signal to the S input of the comparator 12 occurs earlier than the rise signal to the R input and the output of the comparator 12 is L for a period corresponding to the phase difference and the oscillation frequency of the VCO 5 falls. As a result, the drive frequency to the electrodes 1-1 and 1-2 falls and the phases of the waveforms of the electrodes 1-1 and 1-3 increase and the phase difference between the electrodes 1-1 and 1-3 shifts toward 90°.

In this manner, the phase difference between the waveforms of the electrodes 1-1 and 1-3 is detected and the drive frequency of the vibration wave motor is limited such that the phase difference is always kept at 90°. Thus, the vibration wave motor is always driven in the resonance state.

In the vibration wave motor of FIG. 1, the resonance frequency is controlled to the true resonance frequency of the vibration wave motor by the phase locked loop by the phase comparison of the signals, but the resonant frequency is subject to affect of an environment change such as temperature change and it may be locked to other resonance frequency than the true resonance frequency of the vibration wave motor. FIG. 6 shows a circuit diagram of the VCO 5. Numeral 5-1 denotes an operational amplifier, numerals 5-2, 5-6, 5-7, 5-8 and 5-9 denote NPN transistors, numerals 5-3, 5-4 and 5-5 denote PNP transistors, numerals 5-10 and 5-16 denote resistors, numeral 5-11 denotes a capacitor, numerals 5-14 and 5-15 denote NAND gates and numeral 5-17 denotes a constant current source. An input of the VCO 5 is a ⊕ input of the operational amplifier 5-1, and a ⊖ input of the amplifier 5-1 is connected to an emitter of the transistor 5-2 and one end of the resistor 5-10, the other end of which is connected to GND. The operational amplifier 5-1, transistor 5-2 and resistor 5-10 constitute a voltage-current converter which supplies a current representing a voltage applied to the amplifier 5-1 to a collector of the transistor 5-2.

The collector of the transistor 5-2 is connected to collector and base of the transistor 5-3, bases of the transistors 5-4 and 5-5 and the constant current source 5-17, and the transistors 5-3, 5-4 and 5-5 constitute a current mirror circuit.

A collector of the transistor 5-4 is connected to collectors of the transistors 5-6 and 5-7 and bases of the transistors 5-7, 5-8 and 5-9. A collector of the transistor 5-5 is connected to collectors of the transistors 5-8 and 5-9, ⊖ input of the comparator 5-12, ⊕ input of the comparator 5-13 and the capacitor 5-11. A reference voltage $V_1$ is applied to the ⊕ input of the comparator 5-12 and a reference voltage $V_2$ ($V_1 > V_2$) is applied to the ⊖ input of the comparator 5-13. The output of the comparator 5-12 is applied to one input of the NAND gate 5-14, and the output of the NAND gate 5-15 is applied to the other input of the gate 5-14. The output of the comparator 5-13 is applied to one input of the NAND gate 5-15 and the ouput of the gate 5-14 is applied to the other input of the gate 5-15.

The gates 5-14 and 5-15 constitute a flip-flop, and an output of the gate 5-15 of the flip-flop is applied to a base of the transistor 5-6 through the resistor 5-16.

The operation of the VCO 5 thus constructed is now explained. Since the output of the filter 4 is applied to the amplifier 5-1 of the VCO, a current corresponding to the output voltage of the filter 4 flows through the resistor 5-10 so that a voltage is developed at the collector terminal of the transistor 5-2. The amplifier 5-1, resistor 5-10 and transistor 5-2 constitute a voltage-current converter which converts the filter output to a current. More specifically, assuming that the output of the filter 4 is V, the voltage V is applied to the resistor 5-10 and a current $i_1 = V/R$ (where R is a resistance of the resistor 5-10) flows through the resistor 5-10. Assuming that the constant current of the constant current source 5-17 is $i_2$, a sum current I of the currents $i_1$ and $i_2$ is supplied from the transistor 5-3. The current of the transistors 5-4 and 5-5 which constitute the current mirror circuit is also equal to I.

Let us assume that the transistor 5-6 is off and the capacitor 5-11 has been charged. Under this condition, all portions of the current flowing through the transistor 5-4 flows into the transistor 5-7, and the same current as that which flows through the transistor 5-7 flows into the transistor 5-7 and the transistors 5-8 and 5-9 which constitute the current mirror circuit. As a result, the current flowing through the transistor 5-5 and the currents flowing through the transistors 5-8 and 5-9 are equal, and a current corresponding to the current which flows into the transistor 5-5 flows out of the capacitor 5-11 and the capacitor 5-11 is discharged by the current flowing through the transistor 5-5, that is, the current I.

As a result, the potential of the capacitor 5-11 drops. When it falls below the reference level $V_2$, the output of the comparator 5-13 becomes L and the output of the NAND gate 5-15 of the flip-flop becomes H. As a result, the transistor 5-6 is turned on. Thus, the current flowing through the transistor 5-4 flows to ground and the transistors 5-7, 5-8 and 5-9 are turned off. Thus, the capacitor 5-11 is charged by the constant current flowing through the transistor 5-5, that is, the current I and the potential of the capacitor 5-11 rises and reaches the reference $V_1$. As a result, the comparator 5-12 is flipped to change the output to L, which causes the output of the NAND gate 5-15 to be changed to L and the transistor 5-6 to be turned off again. Then, the discharge is again carried out and the charge and discharge are repeated.

As described above, the VCO 5 repeats the charge and discharge by the current I corresponding to the input voltage to the capacitor 5-11 and produces the output pulse of 50% duty factor at a frequency corresponding to the input voltage.

In the circuit of FIG. 1, the pulse of the VCO 5 shown in FIG. 6 is frequency-divided by a factor of 32 by the frequency divider 19 and the frequency-divided pulse is applied to the drive electrode 1-1 as the drive signal. For example, when the resonance frequency of the vibration wave motor is 40 KHz, the frequency of the VCO 5 is 40 KHz$\times$32=1.28 MHz which is very high. Since the frequency of the output pulse of the VCO 5 is determined by one cycle of charge/discharge to the capacitor 5-11 of the VCO 5 as described above, one cycle of charge/discharge of the capacitor 5-11 required to establish the frequency of 1.28 MHz is equal to 1/1.28 MHz$\times\frac{1}{2}$=390 nsec. Since the transistors 5-6 to 5-9, comparators 5-12 and 5-13 and NAND gates 5-14 and 5-15 are inverted to switch the charging and discharging of the VCO 5, a switching time, for example, 50 nsec. is required under a normal condition. Thus, the actual charge/discharge time of the capacitor is 390−50=340 nsec.

On the other hand, the inversion operations of the elements 5-6 to 5-9 and 5-12 to 5-15 when they are switched are affected by the change of environment or a supply voltage Vcc to the VCO 5, and the switching time may vary from the normal 50 nsec. depending on the change of environment.

Let us assume that the switching time has changed from 50 nsec. to 90 nsec. by the change of environment.

In such a case, one cycle of charge/discharge of the capacitor 5-11 including the switching time is 340+90=430 nsec. and the frequency of the VCO 5 is 1/430$\times$2 nsec.=1.1627 MHz. The output frequency of the 1/32 frequency divider 19 is 37.2 KHz.

Thus, the drive frequency of the vibration wave motor which is normally 40 KHz may change to 37.2 KHz by the change of environment. Thus, in spite of limiting the frequency of the VCO 5 within the range of 38-42 KHz to prevent the resonance frequency from being shifted to other resonance frequecy than the true resonance frequency, the self-running frequency of the VCO 5 falls to 37.2 KHz which is below the above range, and the resonance frequency of the VCO 5 may be locked to other resonance frequency than the true resonance frequency.

The change of the self-running frequency of the VCO 5 occurs not only in the VCO shown in FIG. 6 but also in VCO's of other configurations, and the departure from the true resonance frequency of the vibration wave motor due to the change of frequency of the VCO 5 causes a trouble to the operation of the vibration wave motor.

When the vibration wave motor is driven by the phase locked loop control at a high efficiency, it can be driven at the true resonance frequency of the vibration wave motor, but if the vibration wave motor always is driven by the phase locked loop control, the vibration wave motor may be abruptly rotated at the start of rotation.

SUMMARY OF THE INVENTION

It is an object of the present invention to provide a drive circuit for a vibration wave motor which uses an output of a VCO directly as a drive frequency without frequency-dividing the VCO output so that a significant change of a drive frequency is prevented even if a charge/discharge switching time of the VCO varies due to a change of environment, and allows a phase locked loop control of the motor at a true resonance frequency.

In order to achieve the above object, in accordance with one aspect of the present invention, the output of the VCO is directly applied to one of drive electrodes, and a signal which is 90° shifted with respect to the output of the VCO is generated and it is applied to the other drive electrode. A record phase locked loop having the output of the VCO applied to one input of a phase comparator is provided to produce the signal which is 90° shifted with respect to the output of the VCO.

In accordance with another aspect of the present invention, the drive frequency for the vibration wave motor is changed under an open loop control and then the control is shifted to the phase locked loop control to attain smooth rotation of the vibration wave motor.

Other objects of the present invention will be apparent from the following description of the preferred embodiments.

BRIEF DESCRIPTION OF THE DRAWINGS

FIGS. 9A to 9C show a specific configuration of the drive circuit shown in FIG. 7.

DETAILED DESCRIPTION OF THE PREFERRED EMBODIMENTS

Figure 1:
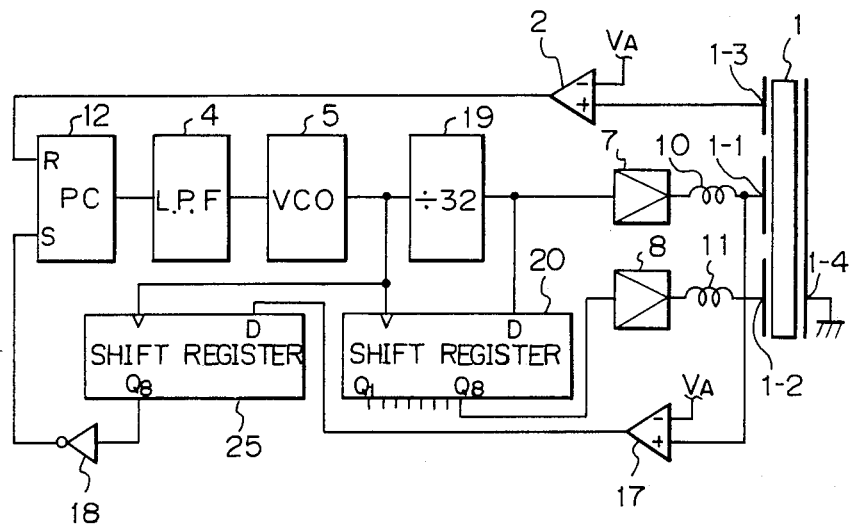
FIG. 1 shows a circuit diagram of a prior art drive circuit for a vibration wave motor.
Figure 2:
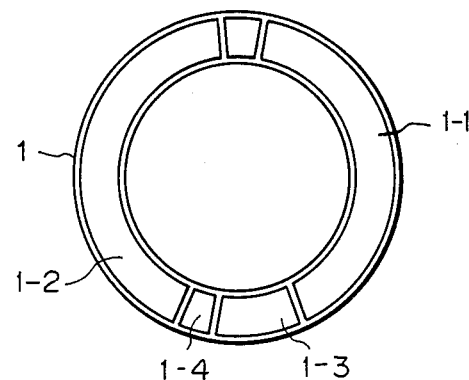
FIG. 2 shows an electrode structure of the vibration wave motor.
Figure 3:
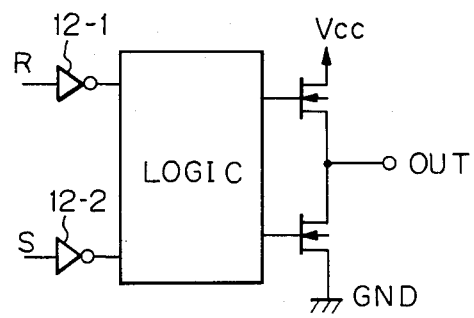
FIG. 3 shows a block diagram of a comparator 12 shown in FIG. 1.
Figure 7:
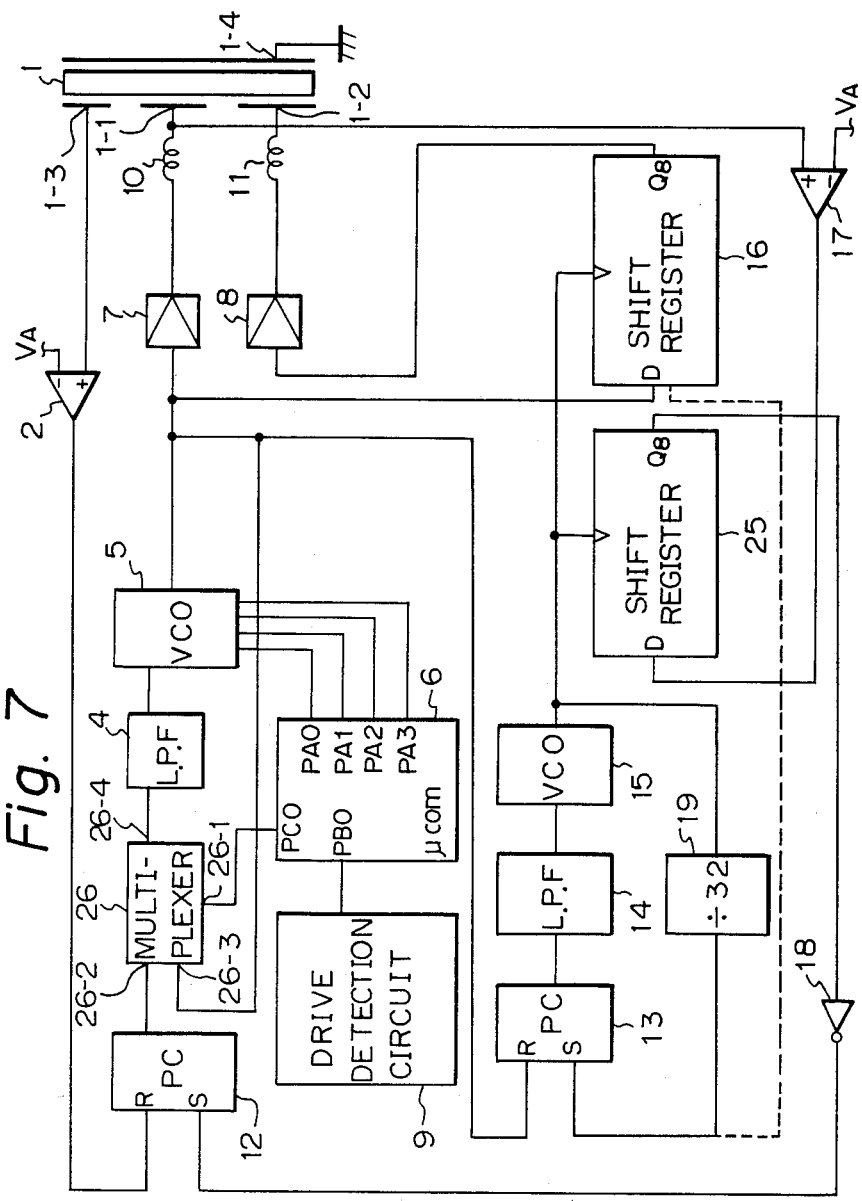
FIG. 7 shows an embodiment of a drive circuit for the vibration wave motor in accordance with the present invention.

FIG. 7 shows a circuit diagram of one embodiment of a drive circuit for a vibration wave motor. The like elements to those shown in FIG. 1 are designated by the like numerals. Numeral 6 denotes a microcomputer having an input port PB0 and output ports PA0–PA3 and PC0. The output ports PA0–PA3 of the microcomputer 6 are applied to a VCO 5 which determines an oscillation frequency in accordance with the outputs of the output ports PA0–PA3 of the microcomputer 6.

Numeral 26 denotes a multiplexor having one input 26-2 connected to an output of a comparator 12 and other input 26-3 connected to the output of the VCO 5. An input 26-1 of the multiplexor is connected to the output port PC0 of the microcomputer 6. When the output port PC0 sends out H, the multiplexor 26 selects the input 26-2 to pass the input signal of the input 26-2 to an output terminal 26-4, and when the output port PC0 sends out L, the multiplexor 26 selects the input 26-3 to pass the input signal of the input 26-3 to the ouput 26-4.

Numeral 9 denotes a drive detection circuit which detects the rotation of the vibration wave motor to produce a pulse when the vibration wave motor rotates. The output of the circuit 9 is supplied to the input port PB0 of the computer 6. The computer 6 checks whether there is a change in the input signal to the input port PB0 within a predetermined time, and if there is no change in the predetermined time, the computer 6 changes the outputs (binary codes) of the output ports PA0–PA3. The outputs of the output ports PA0–PA3 are all "0" at the initial state. If no change in the input signal to the input port PB0 is detected within the predetermined time, the output ports are changed by binary codes. The VCO 5 generates a higher frequency as the binary codes of the output ports PA0–PA3 increase. A lock range is set such that the change of frequency of the VCO 5 due to the change of outputs of the output ports PA0–PA3 is smaller than the lock range in the phase locked loop by the comparator 12, filter 4 and VCO 5, and other resonance frequency than the true resonance frequency of the vibration wave motor is not included in the lock range.

Numeral 13 denotes a comparator which is identical to the comparator 12, numeral 14 denotes a filter which is identical to the filter 4, and numeral 15 denotes a VCO which is identical to the VCO 5. The output of the VCO 5 is applied to a 1/32 frequency-divider 19, an output of which is applied to the input of the comparator 13.

Numeral 25 denotes an eight-stage shift register. A D input is connected to the output of the comparator 17, a clock input is connected to the output of the VCO 15, and an eighth stage output Q8 is connected to an S input of the comparator 12. Numeral 16 denotes an eight-stage shift register which is identical to the register 25. A D input is connected to the output of the VCO 5, a clock terminal is connected to the output of the VCO 15 and an eighth stage output Q8 is supplied to the amplifier 8.

The operation of the drive circuit of the present invention shown in FIG. 7 is now explained.

Figure 8:
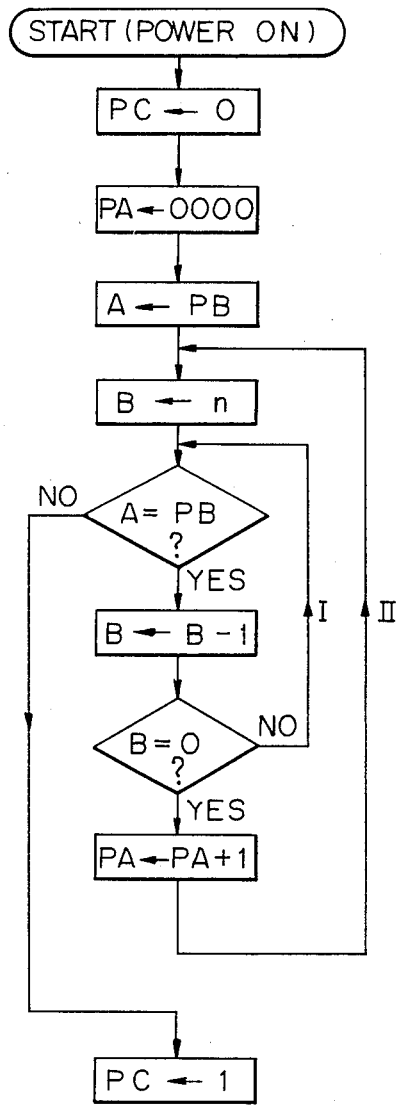
FIG. 8 shows an operation flow of a computer 6 shown in FIG. 7.

The circuit is powered by turning on a power switch not shown. The computer 6 thus starts the operation. FIG. 8 shows a flow chart of a program for the computer 6, as the power switch is turned on, the computer 6 sends not L from the output port PC0 and causes the outputs of the output ports PA0–PA3 to L.

Under this condition, the input 26-3 of the multiplexor 26 is selected and the input 26-2 is not selected. Thus, the VCO 5 is inhibited from determining the oscillation frequency based on the output of the comparator 12 but the frequency is determined based on the outputs of the output ports PA0–PA3 of the computer 6.

Since the outputs of the output ports PA0–PA3 are all L, the VCO 5 oscillates at a lower limit of the oscillation frequency. The output of the VCO 5 is applied to the filter 4 through the multiplexor 26, but since the duty factor of the output pulse of the VCO 5 is 50%, a potential which is one half of the amplitude of the output pulse of the VCO 5 is applied to the filter 4 independently from the output frequency of the VCO 5 and it is applied to the VCO 5. Accordingly, the output frequency of the VCO 5 is determined based on the outputs of the output ports PA0–PA3 of the computer 6.

After the VCO 5 has started its operation, the computer 6 receives the output of the drive detection circuit 9 at the input port PB0 and loads it into an A register in the computer 6.

Then, the computer 6 sets a constant n into a B register in the computer 6 and again detects the input data of the input port PB0. If the detected data is identical to the content of the A register, the content of the B register is decremented by one. If the vibration wave motor is not in rotation state, there is no change in the output of the drive detection circuit 9 and the detected data is equal to the content of the A register. Thus, the data n in the B register is decremented to n−1, which is loaded into the register B.

Then, whether the content of the B register is zero or not is checked, and if it is not zero, the input data of the input port PB0 is again detected and it is compared with the content of the A register. If the vibration wave motor is not in the drive state, the above operation is repeated until the content of the B register reaches zero by the decrement operation, that is, repeated n times.

The above series of operations detects the drive of the vibration wave motor for a predetermined time. If the drive of the vibration wave motor is not detected by the series of operations, the output binary codes of the output ports PA0–PA3 of the computer 6 are incremented by one. Thus, the frequency of the VCO 5 increases. Thereafter, the above series of operations are repeated. If the output of the drive detection circuit 9 of the computer 6 does not change for the predetermined time, the computer 6 increases the frequency of the VCO 5 sequentially for every predeterminal time interval to approach the oscillation frequency of the VCO 5 to the resonance frequency of the vibration wave motor. If the output of the drive detection circuit 9 changes from the data initially boaded to the A register, that is, if the oscillation frequency of the VCO 5 approaches to the true resonance frequency of the vibration wave motor and enters into the lock range of the phase locked loop comprising the comparator 12, filter 4 and VCO 5 so that the vibration wave motor moves from the non-drive state to the drive state, the computer 6 inhibits the further update of the outputs of the output ports PA0–PA3 and maintains the outputs of the output ports PA0–PA3 as they are, and sends out H from the output port PC0.

As a result, the multiplexor 26 passes the input data at the input 26-2 to the output 26-4.

The output pulse of the VCO 5 is applied to the electrode 1-1 through the amplifier 7 and coil 10, and also applied to the R input of the comparator 13.

The comparator 13, filter 14 and VCO 15 function similarly to the comparator 12, filter 4 and VCO 5 of FIG. 1 and control to cause the phases of the pulses to the R and S inputs of the comparator 13 to be equal, as a result, the pulses of the R and S inputs of the comparator 13 are rendered in phase. Since the frequency divider 19 frequency-divides the pulse of the VCO 15 by a factor of 32, the frequency of the output pulse of the VCO 15 is 32 times as high as the frequency of the output pulse of the VCO 15, that is, the output pulse of the VCO 5. The pulse of the VCO 15 is applied to the clock terminal of the shift register. Since the output pulse of the VCO 5 is applied to the D input of the register 16, the eighth stage output Q8 of the shift register 16 is retarded by 90° with respect to the output pulse of the VCO 5. This pulse is applied to the electrode 1-2 through the amplifier 8 and coil 11. Since the output of the VCO 5 is applied to the electrode 1-1 as described above, a periodic signal having a 90° phase difference with respect to the signal applied to the electrode 1-1 is applied to the electrode 1-2. Since the output of the VCO 5 is close to the true resonance frequency of the vibration wave motor, the vibration wave motor maintains the drive state.

Under such drive state of the vibration wave motor, the output of the comparator 12 is applied to the filter 4 and the frequency of the VCO 5 is controlled by the output of the comparator 12.

The periodic signal pulse representing the drive state of the vibration wave motor is applied to the R input of the comparator 12 from the electrode 1-3, and the pulse from the Q8 output of the shift register 25 is applied to the S input. The D input of the register 25 receives the signal of the electrode 1-1 through the comparator 17, that is, the pulse of the same frequency and phase as those of the pulse from the VCO 5, and the clock input of the shift register 25 receives the output of the VCO 15. Since the frequency of the output of the VCO 15 is 32 times as high as the frequency of the output of the VCO 5, the eighth stage output pulse Q8 of the register 25 is retarded by 90° with respect to the pulse of the VCO 5. Since the pulse at the output Q8 of the register 25 is applied to the S input of the comparator 12 through the inverter 18, the periodic signal from the electrode 1-3 is applied to the R input of the comparator 12 and the pulse which is advanced by 90° with respect to the periodic signal of the electrode 1-1 is applied to the S input of the comparator 12 as is done in FIG. 1. The comparator 12, filter 4 and VCO 5 control the output frequency of the VCO 5 to render the input pulses to the R and S inputs of the comparator 12 to be in phase, that is, to keep a 90° phase difference between the periodic voltages of the electrodes 1-1 and 1-3 so that the output frequency of the VCO 5 is always kept at the true resonance frequency. In the embodiment shown in FIG. 7, the output signal of the VCO 5 is used as the drive signal for the vibration wave motor. Accordingly, even if the charge/discharge switching time of the VCO 5 is affected by the change of environment, the change of the output frequency of the VCO 5 due to the change of environment is negligible and the vibration wave motor can always be driven at the true resonance frequency.

More specifically, when the normal oscillation frequency of the VCO 5 is 40 KHz and the charge/discharge switching time is 50 nsec, even if the charge/discharge switching time changes from 50 nsec to 90 nsec by the change of environment as did in FIG. 1, the frequency of the VCO 5 is 39.87 Hz and the frequency of the VCO 5 or the drive frequency of the vibration wave motor is kept within the lock range of the phase locked loop comprising the comparator 12, filter 4 and VCO 5. Accordingly, the vibration wave motor can always be driven at the true resonance frequency.

Figure 4:
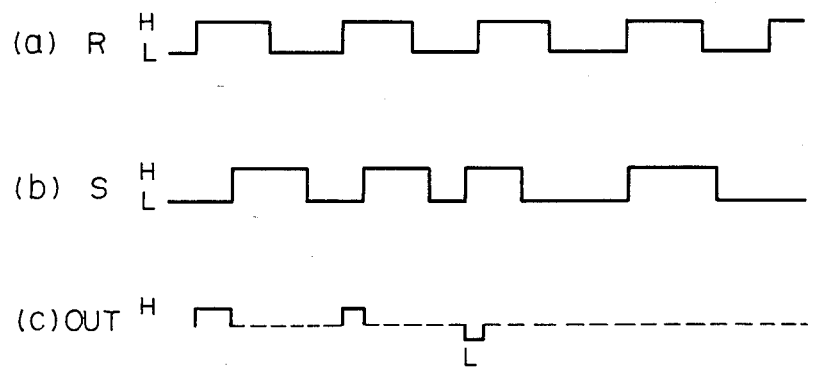
FIGS. 4(a), 4(b) and 4(c) show waveforms for explaining the operation of the comparator 12.
Figure 5:
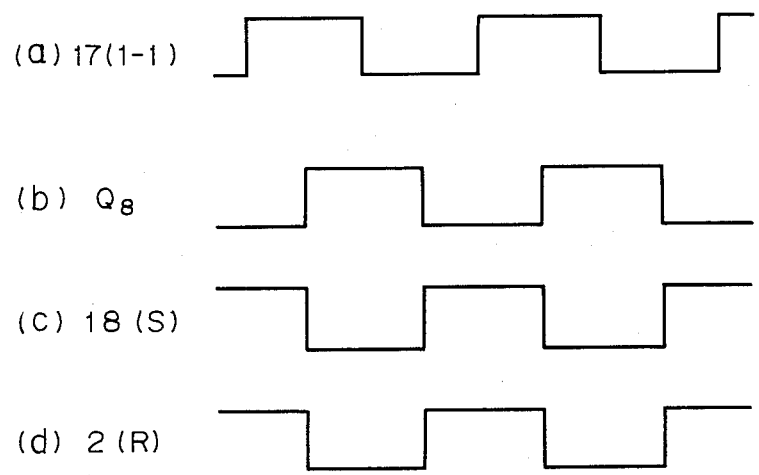
FIGS. 5(a), 5(b), 5(c) and 5(d) show waveforms for explainig the operation of FIG. 1.
Figure 9B:
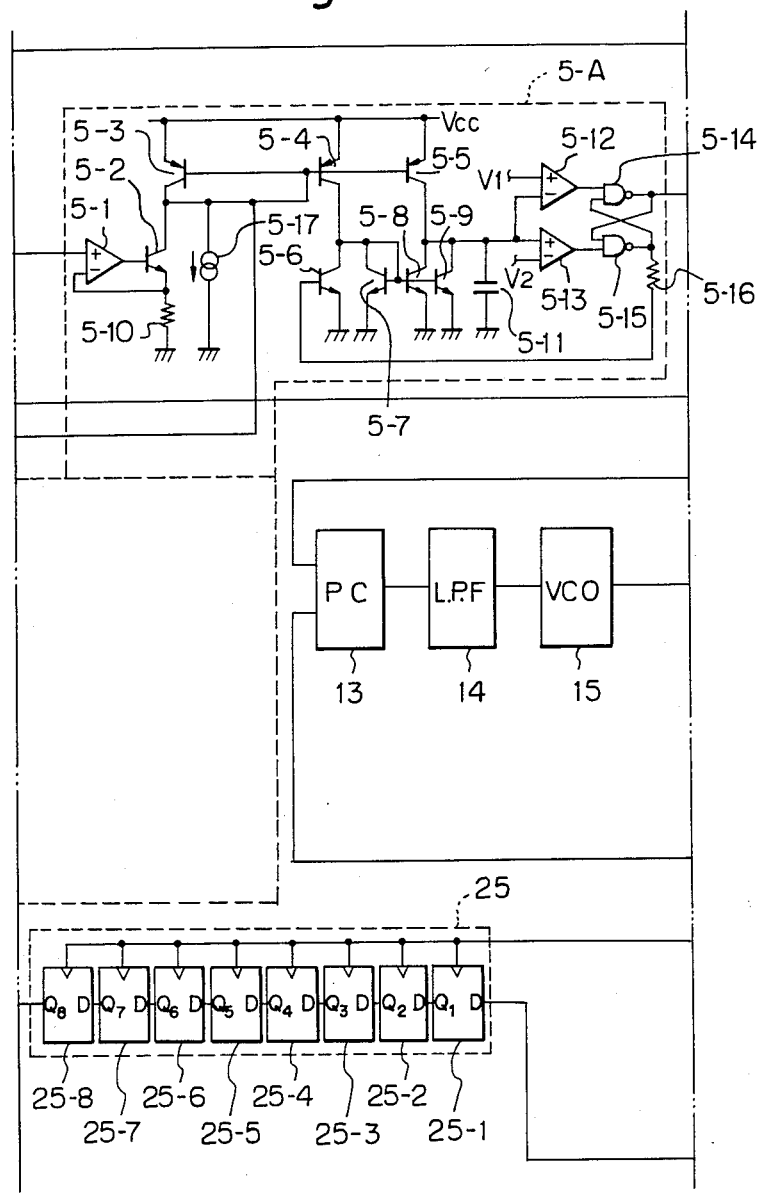
Figure 9C:
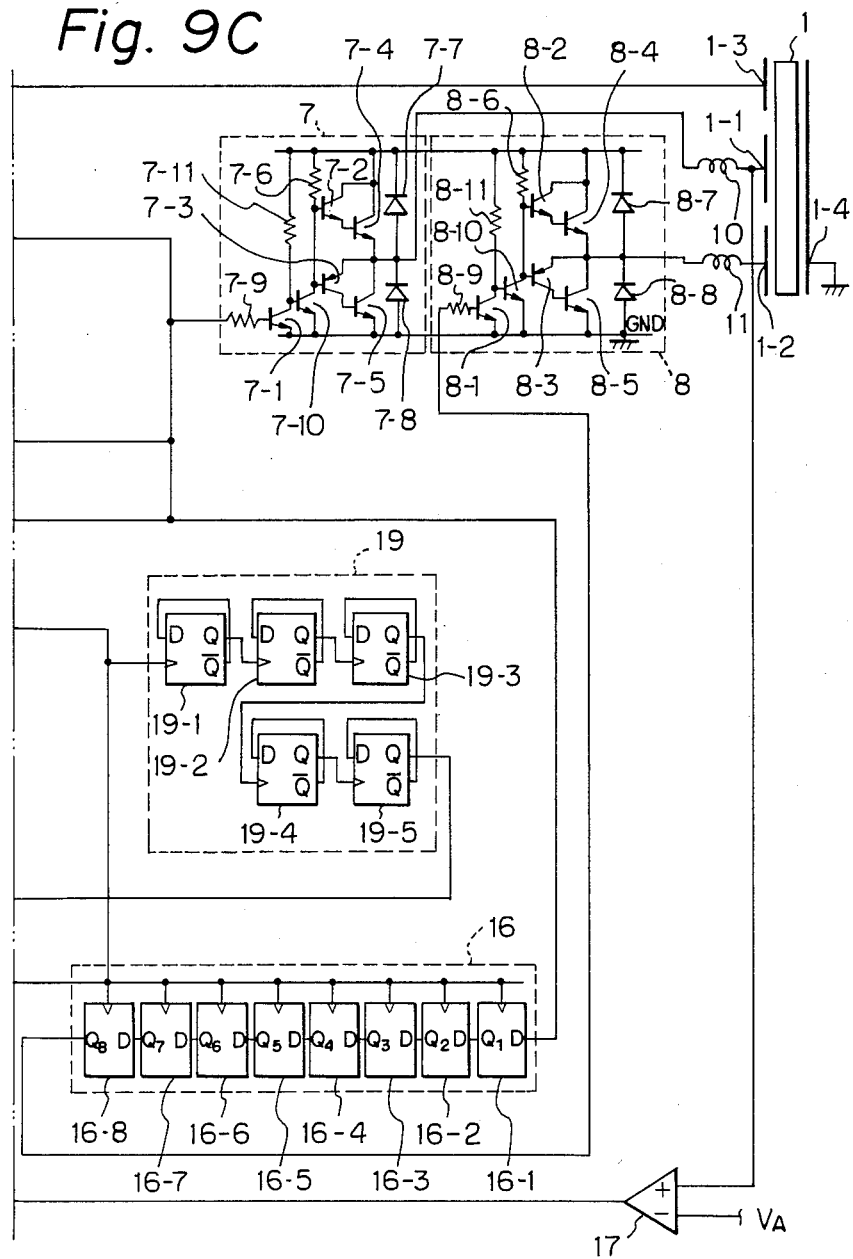

FIG. 9 shows a circuit diagram of a specific configuration of the vibration wave motor drive circuit shown in FIG. 7. The like blocks to those shown in FIG. 4 are designated by the like numerals. In a phase comparator 12, numerals 12-1, 12-2, 12-13, 12-14, 12-15 and 12-16 denote inverters, numerals 12-3 and 12-8 denote AND gates, numerals 12-4, 12-5, 12-6 and 12-7 denote OR gates, numerals 12-9 and 12-12 denote NOR gates, numerals 12-10 and 12-11 denote NAND gates, numeral 12-17 denotes a P-channel MOSFET and numeral 12-18 denotes an N-channel MOSFET.

A low-pass filter 4 comprises resistors 4-1 and 4-2 and a capacitor 4-3. The resistor 4-1 is connected between input and output of the low-pass filter 4, and the resistors 4-2 and capacitor 4-3 are connected in series between the output and ground GND.

Figure 6:
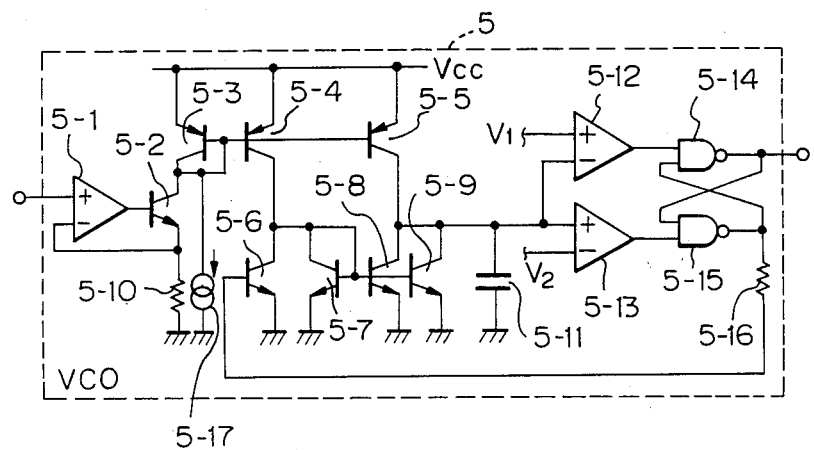
FIG. 6 shows a circuit diagram of a VCO 5 shown in FIG. 1.

Numerals 5-A and 5-B denote ports of the VCO 5. The port 5-A is of the same configuration as that of FIG. 6 and the explanation thereof is omitted.

In the port 5-B, numeral 5-25 denotes a transistor having an emitter connected to a constant voltage Vc. Base and collector of the transistor 5-25 are connected to a collector of a transistor 5-18 and a base of a transistor 5-26.

Numerals 5-18, 5-19, 5-20, 5-21, 5-22, 5-23 and 5-24 denote transistors. Bases of those transistors are connected in common and to collectors of the transistors 5-19, 5-26 and 5-27. Emitters of the transistors 5-26 and 5-27 are connected to ground GND through a resistor 5-35. Bases of the transistors 5-27 and 5-28 are connected to a collector of the transistor 5-28 and one end of a resistor 5-36, the other end of which is connected to Vcc. An emitter of the transistor 5-28 is connected to ground GND. A collector of the transistor 5-20 is connected to a cathode of a diode 5-31 and an input of an analog switch 5-37, a collector of the transistor 5-21 is connected to a cathode of a diode 5-32 and an input of an analog switch 5-38, a collector of the transistor 5-22 is connected to a cathode of a diode 5-33 and an input of an analog switch 5-39, and collectors of the transistors 5-23 and 5-24 are connected to a cathode of a diode 5-34 and an input of an analog switch 5-40. Outputs of the analog switches 5-37, 5-38, 5-39 and 5-40 are grounded. Anodes of the diodes 5-31, 5-32, 5-33 and 5-34 are connected to bases of the transistors 5-29 and 5-30 and a collector of the transistor 5-29. Emitters of the transistors 5-29 and 5-30 are grounded and emitters of the transistors 5-18 to 5-24 are connected to Vcc. Control terminals of analog switches 5-37, 5-38, 5-39 and 5-40 are connected to the output ports PA0, PA1, PA2 and PA3 of the computer 6, respectively.

Numeral 9 denotes a drive detection circuit. Numeral 9-1 denotes a buffer gate for shaping a waveform, numerals 9-2 and 9-3 denote resistors, numeral 9-4 denotes a photo-transistor, numeral 9-5 denotes an LED and numeral 9-6 denotes a pulse plate attached to a side of a movable member (rotor) of a motor, not shown. First ends of the resistors 9-2 and 9-3 are connected to Vcc, the other end of the resistor 9-2 is connected to an input of the buffer gate 9-1 and a collector of the photo-transistor 9-4, the other end of the resistor 9-3 is connected to a cathode of the LED 9-5, and an emitter of the transistor 9-4 and an anode of the LED 9-5 are grounded. When a light emitted from the LED 9-5 impinges to a white pattern of the pulse plate 9-6, a reflected light is sensed by the photo-transistor 9-4 so that a photo-current flows through the resistor 9-2 and the output of the gate 9-1 assumes L level. When the light from the LED impinges to a block pattern of the pulse plate 9-6, no photo-current flows through the photo-transistor and the output of the gate 9-1 assumes H level.

In a frequency divider 19, numerals 19-1 to 19-5 denote D type flip-flops which constitute the 1/32 frequency divider for the input pulse from the VCO 15. In an amplifier 7, numerals 7-1, 7-10, 7-2, 7-4 and 7-5 denote NPN transistors, numeral 7-3 denotes a PNP transistor, and numerals 7-7 and 7-8 denote diodes. An amplifier 8 is of the same construction as the amplifier 7.

In shift registers 16 and 25, numerals 16-8 and 25-1 to 25-8 denote D type flip-flops each having a clock terminal connected to the output of the VCO 15 and an output terminal thereof connected to a D input terminal of the succeeding stage flip-flop.

Comparators 13 and filter 14 are of the same construction as the comparator 12 and filter 4, respectively, and the VCO 15 is of the same construction as the port 5-A of the VCO 5. The operation of FIG. 1 is same as that of the embodiment of FIG. 7 and the explanation thereof is omitted. The operation of the port 5-B of the VCO 5 and the drive detection circuit 9 of FIG. 9 is briefly explained.

When the voltage Vcc is applied to a feed line of the VCO 5, a current flows through the series circuit of the resistor 5-36 and the transistor 5-28 and the base/collector potential of the transistor 5-28 is equal to one diode voltage drop (approximately 0.7 volt). Since the base potential of the transistor 5-27 is equal to the base potential of the transistor 5-28, a current smaller than the collector current of the transistor 5-28 starts to flow into the collector of the transistor 5-27 in accordance with the resistance of the resistor 5-35. Since the load to the transistor 5-27 is the diode-connected transistor 5-19, the same current as the collector current of the transistor 5-27 flows through the transistor 5-19 end a base-emitter voltage of the transistor 5-19 is determined by that current. Since the bases of the transistors 5-18 and 5-19 are connected together, the current in the transistor 5-19 is shifted to the transistor 5-18 and it flows into the diode-connected transistor 5-25. Since Vc (approximately 1.2 volt) is applied to the emitter of the transistor 5-25, the base/collector potential of the transistor 5-25 is one diode voltage drop higher than Vc (that is, approximately 1.9 volts) and this voltage is applied to the base of the transistor 5-26. The base voltage of the transistor 5-26 is approximately 1.9 volts as described above while the base voltage of the transistor 5-27 is approximately 0.7 volt. Since the base voltage of the transistor 5-26 is higher, the transistor 5-27 is cut off and the emitter potential of the transistor 5-26 is the base-emitter voltage of the transistor 5-26 (approximately 0.7 volt) lower, and a quotient of the emitter porential of the transistor 5-26 divided by the resistance of the resistor 5-35 flows into the collector of the transistor 5-26. (It is assumed that a grounded emitter current amplification factor hfe of each transistor is sufficiently high.) Since the collector currents of the transistors 5-18 and 5-19 are equal, the collector currents of the transistors 5-25 and 5-26 are also equal. Accordingly, the base-emitter voltages of the transistors 5-25 and 5-26 are equal and the emitter voltage of the transistor 5-26 is equal to the constant voltage Vc (approximately 1.2 volt). Accordingly, the collector current of the transistor 5-26 is a quotient of Vc divided by the resistance of the reistor 5-35. If Vc and the resistance of the resistor 5-35 are not affected by the environment such as temperature, the collector current of the transistor 5-26 and the collector currents of the transistors 5-19 and 5-18 which are equal to the former are defined to a stable current. Since the base-emitter voltages of the transistors 5-20 to 5-24 are equal to that of the transistor 5-19, the collector current of the transistor 5-20 is equal to the collector current $i_o$ (=Vc/R, where R is the resistance of the resistor 5-35) of the transistor 5-19. The collector current of the transistor 5-21 is equal to $2i_o$ because it is equivalent to two parallel-connected transistors 5-20. Similarly, the collector currents of the transistors 5-22 to 5-24 are equal to $4i_o$. Accordingly, when the analog switched 5-37 to 5-40 are in the off-state, the currents flowing through the diodes 5-31 to 5-34 are equal to $i_o$, $2i_o$, $4i_o$ and $8i_o$, respectively, and a total of $15i_o$ flows through the collector of the transistor 5-29, and the same amount of current $15i_o$ flows through the collector of the transistor 5-30 having the base thereof connected to the base of the transistor 5-29. For example, when the analog switch 5-37 is on, the collector current of the transistor 5-20 flows to the ground through the switch 5-37 so that the collector current of the transistor 5-29 is equal to $14i_o$. Similarly. the collector current of the transistor 5-29 or the collector current of the transistor 5-30 is variable between D and $15i_o$ at an interval of $i_o$ depending on the on and off states of the analog switches 5-37 to 5-40.

The switches 5-37 to 5-40 are switched in accordance with the binary codes of the output of the output ports PA3 to PA0 of the computer 6 at a predetermined interval until the vibration wave motor is driven so that the collector current of the transistor 5-30 is incremented by $i_o$ at a time and the output frequency of the VCO 5 rises. Since the pulse plate 9-6 is not displaced when the vibration wave motor is not driven, the output of the gate 9-1 of the drive detection circuit 9 is kept L. As the drive frequency approuches the true resonance frequency of the vibration wave motor by the operation of the VCO 5 and the vibration wave motor moves to the drive state, the pulse plate is displaced and the output of the gate 9-1 repeats H and L. The computer 6 responds to the change of signal to inhibit further change at the output ports PA0 to PA3 and determines the frequency at the power-on of the VCO 5.

In the drive circuit for the vibration wave motor of the present invention, the phase difference between the drive periodic signal applied to the drive electrode and the monitor periodic signal from the monitor electrode is detected and the output frequency of the voltage controlled oscillator which directly generates the periodic signal applied to the drive electrode is controlled such that the phase difference is kept in the predetermined relationship. Accordingly, even if the charge/discharge switching time of the voltage controlled oscillator is affected by the change of environment, the output frequency of the voltage controlled oscillator does not significantly change and the true resonance frequency is always maintained.

While the elctrostrictive elements are used in the present embodiment, other electro-mechanical energy conversion elements such as piezo-electric elements which vibrate upon application of a voltage may be used. In the vibration wave motor of the present invention, a movable member (not shown) which is press-contacted to the stator and rotated by a travelling vibration wave generated on the surface of the rotor is provided.

While the output of the VCO 5 of FIG. 7 is connected to the D input of the shift register 16, the output of the frequency divider 19 may be connected to the D input of the shift register 16 as shown by a broken line.

We claim:

1. A vibration wave motor for relatively moving a movable member by a travelling wave motor generated by applying periodic signals of different phases from each other to first and second electro-mechanical energy conversion means, respectively, arranged at different positions on a vibration member, comprising
   (a) an oscillator for directly generating the periodic signal to be applied to said first electro-mechanical energy conversion means;
   (b) a phase comparator having the periodic signal of said oscillator applied to one input terminal thereof for generating an output representing a phase difference between the periodic signal applied to the one input terminal and a periodic signal applied to the other input terminal;
   (c) A frequency signal generator for generating a frequency signal having a frequency corresponding to the output of said phase comparator and higher than the frequency of the periodic signal generated by said oscillator;
   (d) a frequency divider for frequency-dividing the periodic signal generated by said frequency signal generator having an output thereof applied to the other input terminal of said phase comparator; and
   (e) shift means for shifting the periodic signal from said oscillator or the output of said frequency divider in synchronism with the signal from said frequency signal generator;
   the signal shifted by said shift means being applied to said second electro-mechanical energy conversion means.

2. A vibration wave motor for relatively moving a movable member by a travelling wave motor generated by applying periodic signals of different phases from each other to first and second electro-mechanical energy conversion means, respectively, arranged at different positions on a vibration member, comprising
   (a) sense means for sensing a drive state of said vibration wave motor to generate a periodic signal representing the drive state;
   (b) a first phase comparator for generating an output representing a deviation from a predetermined phase difference between the periodic signal applied to said first or second electro-mechanical energy conversion means and the periodic signal generated by said sense means;
   (c) a first oscillator for generating a periodic signal having a frequency corresponding to the output of said first phase comparator,
   the periodic signal of said first oscillator being applied to said first electromechanical energy conversion means;
   (d) a second phase comparator having the periodic signal of said first oscillator applied to one input terminal thereof for generating an output representing a phase difference between the periodic signal applied to the one input terminal and a periodic signal applied to the other input terminal;
   (e) a second oscillator for generating a signal having a frequency corresponding to the output of said second phase comparator and higher than a frequency of the periodic signal generated by said first oscillator;
   (f) a frequency divider for frequency-dividing the periodic signal generated by said second oscillator,
   the output of said frequency divider being applied to the other input terminal of said second phase comparator; and
   (g) shift means for shifting the periodic signal from said first oscillator or the output of said frequency divider in synchronism with the signal from said second oscillator,
   the signal shifted by said shift means being applied to said second electro-mechanical energy conversion means.

3. A vibration wave motor according to claim 1 wherein said shift means includes a shift register which shifts the input signal in synchronism with the signal from said frequency signal generator, and an output at predetermined stage of said shift register is applied to said second electro-mechanical energy conversion means.

4. A vibration wave motor according to claim 2 wherein said shift means includes a shift register which shifts the input signal in synchronism with the signal from said second oscillator, and an output at a predetermined stage of said shift register is applied to said second electro-mechanical energy conversion means.

5. A vibration wave motor according to claim 1 or 3 wherein said phase comparator generates a first output when the periodic signal to the one input terminal is advanced to the periodic signal to the other input terminal, a second output when the periodic signal to the one input is retarded to the periodic signal to the other input terminal and a third output when both periodic signals are in phase, and said frequency signal generator increases or decreases the output frequency when said phase comparator generates the first or second output and holds the output frequency when said phase comparator generates the third output.

6. A vibration wave motor according to claim 2 or 4 wherein said second phase comparator generates a first output when the periodic signal to the one input terminal is advanced to the periodic signal to the other input terminal, a second output when the periodic signal to the one input is retarded to the periodic signal to the other input terminal and a third output when both periodic signals are in phase, and said second oscillator increases or decreases the output frequency when said second phase comparator generates the first or second output and holds the output frequency when said second phase comparator generates the third output.

7. A vibration wave motor according to claim 1 or 2 wherein said electro-mechanical energy conversion means are electrostrictive elements.

8. A vibration wave motor according to claim 1 or 2 wherein said electro-mechanical energy converesion means are piezo-electric elements.

9. A vibration wave motor for relatively moving a movable member by a travelling wave motor generated by applying periodic signals of different phases from each other to first and second electro-mechanical energy conversion means, respectively, arranged at different positions on a vibration member, comprising (a) sense means for sensing a drive state of said vibration wave motor to generate a periodic signal representing the drive state;

(b) a phase comparator for generating a signal corresponding to a deviation from a predetermined phase difference between the periodic signal sensed by said sense means and the periodic signal applied to said electro-mechanical energy conversion means;

(c) a frequency determination circuit having a first mode in which the frequency of the periodic signal applied to said electro-mechanical energy conversion means is determined in accordance with the output of said phase comparator and a second mode in which the frequency of the periodic signal is gradually changed independently from the output of said phase comparator, said frequency determination circuit operating in the second mode at the time of start and then being permitted to move into the first mode.

* * * * *

UNITED STATES PATENT AND TRADEMARK OFFICE
CERTIFICATE OF CORRECTION

PATENT NO. : 4,749,896
DATED : June 7, 1988
INVENTOR(S) : Suzuki, et al.

It is certified that error appears in the above-identified patent and that said Letters Patent is hereby corrected as shown below:

IN THE PATENT REFERENCES [56]

Line U.S. Patent Documents, "Yammamoto" should read --Yamamoto--.

COLUMN 1

Line 12, "frequecy" should read --frequency--.
Line 24, "drive electrode" should read --drive electrodes--.
Line 27, "a" should read --an--.

COLUMN 2

Line 9, "VCO, S" should read --VCO, 5--.

COLUMN 4

Line 45, "affect" should read --effect--.

COLUMN 5

Line 21, "VCO, S" should read --VCO, 5--.

COLUMN 6

Line 40, "frequecy" should read --frequency--.

UNITED STATES PATENT AND TRADEMARK OFFICE
CERTIFICATE OF CORRECTION

PATENT NO. : 4,749,896

DATED : June 7, 1988

INVENTOR(S) : Suzuki, et al.

It is certified that error appears in the above-identified patent and that said Letters Patent is hereby corrected as shown below:

COLUMN 7

Line 32, "explainig" should read --explaining--.
Line 54, "multiplexor" should read --multiplexer--.
Line 57, "multiplexor" should read --multiplexer--.
Line 59, "multiplexor" should read --multiplexer--.
Line 62, "multiplexor" should read --multiplexer--.
Line 64, "ouput 26-4." should read --output 26-4.--.

COLUMN 8

Line 34, "eighth stage" should read --eight-stage--.
Line 45, "plexor" should read --plexer--.
Line 54, "multiplexor" should read --multiplexer--.

UNITED STATES PATENT AND TRADEMARK OFFICE
CERTIFICATE OF CORRECTION

PATENT NO. : 4,749,896

DATED : June 7, 1988

INVENTOR(S) : Suzuki, et al.

It is certified that error appears in the above-identified patent and that said Letters Patent is hereby corrected as shown below:

COLUMN 9

Line 29, "boaded" should read --loaded--.
        Line 40, "multiplexor" should read
                --multiplexer--. and
        Line 54, "VCO 15," should read --VCO 5,--.

COLUMN 10

Line 67, "tors 4-2" should read --tor 4-2--.

COLUMN 11

Line 53, "LED" should read --LED 9-5--.

COLUMN 12

Line 1, "Comparators 13" should read
                --Comparator 13--.
        Line 21, "end" should read --and--.
        Line 38, "portential" should read --potential--.
        Line 50, "reistor" should read --resistor--.
        Line 64, "analog switched" should read
                --analog switches--.

COLUMN 13

Line 7, "Similarly." should read --Similarly,--.
        Line 21, "approuches" should read --approaches--.

UNITED STATES PATENT AND TRADEMARK OFFICE
CERTIFICATE OF CORRECTION

PATENT NO. : 4,749,896

DATED : June 7, 1988

INVENTOR(S) : Suzuki, et al.

It is certified that error appears in the above-identified patent and that said Letters Patent is hereby corrected as shown below:

COLUMN 14

Line 39, electromechanical: should read
          --electro-mechanical--. and
  Line 68, "predetermined' should read
          --a predetermined--.

COLUMN 15

Line 14, "input is" should read
          --input terminal is--.
  Line 26, "input is" should read
          --input terminal is--.

COLUMN 16

Line 5, "converesion" should read --conversion--.
  Line 21, "means;" should read --means; and--.

Signed and Sealed this

Ninth Day of May, 1989

*Attest:*

DONALD J. QUIGG

*Attesting Officer*  *Commissioner of Patents and Trademarks*